United States Patent
Yamauchi

[11] Patent Number: 5,324,095
[45] Date of Patent: Jun. 28, 1994

[54] SUSPENSION SEAT
[75] Inventor: Yoshihiko Yamauchi, Ayase, Japan
[73] Assignee: Ikeda Bussan Co., Ltd., Ayase, Japan
[21] Appl. No.: 931,378
[22] Filed: Aug. 18, 1992
[30] Foreign Application Priority Data

| Aug. 27, 1991 | [JP] | Japan | 3-075806[U] |
| Sep. 19, 1991 | [JP] | Japan | 3-084187[U] |
| Sep. 19, 1991 | [JP] | Japan | 3-084188[U] |

[51] Int. Cl.⁵ .................................. B60N 2/16
[52] U.S. Cl. ...................... 297/344.14; 297/216.16
[58] Field of Search ........... 297/345, 344, 216, 216.13, 297/216.1, 216.16, 216.19, 216.2, 344.1, 344.14, 344.15; 248/564, 565, 594

[56] References Cited
U.S. PATENT DOCUMENTS

| 2,470,907 | 5/1949 | White et al. | 248/564 |
| 2,606,592 | 8/1952 | McIntrye | 248/564 |
| 2,680,472 | 6/1954 | Hempe, Jr. | 248/565 |
| 2,991,970 | 7/1961 | White et al. | 248/565 |
| 4,181,353 | 1/1980 | Grass et al. | 248/564 X |
| 4,353,594 | 10/1982 | Lowe | 248/564 X |
| 4,662,597 | 5/1987 | Uecher et al. | 248/564 |
| 4,838,514 | 6/1989 | Hill | 297/345 X |
| 5,116,016 | 5/1992 | Nagata | 248/564 X |

FOREIGN PATENT DOCUMENTS

| 0268900 | 2/1969 | Austria | 297/345 |
| 3031175 | 3/1981 | Fed. Rep. of Germany | 297/344 |
| 57-20242 | 2/1982 | Japan . | |
| 0308892 | 9/1972 | U.S.S.R. | 248/564 |

Primary Examiner—Kenneth J. Dorner
Assistant Examiner—Milton Nelson, Jr.
Attorney, Agent, or Firm—Foley & Lardner

[57] ABSTRACT

A suspension seat for an automotive vehicle includes a seat frame which is vertically movably supported on a parallel link mechanism having front and rear links. A compression spring and a shock absorber are coaxially combined and installed between an upper and back side portion of the seat frame and an arm portion connected to the rear link. Therefore, the suspension seat sufficiently absorbs an impact force while keeping small a space between the seat and the floor.

10 Claims, 9 Drawing Sheets

SUSPENSION SEAT

BACKGROUND OF THE INVENTION

1. Field of the Invention

The present invention relates to improvements in a vehicular seat, and more particularly to a suspension seat in which a seat frame is supported to a suspension unit for absorbing vibrations and impacts applied thereto.

2. Description of the Prior Art

A variety of suspension seats have been proposed and put into practical use. A typical suspension seat is arranged such that a seat frame is elastically supported by a parallel link mechanism and a suspension unit which are disposed between a seat cushion and a floor. Additionally, at least a pair of extension springs are connected to the parallel link mechanism for applying upward biasing force to the suspension seat. In order to simplify the structure of the suspension mechanism, Japanese Utility Model Provisional Publication No. 57-20242 discloses a seat cushion in which a compression spring and a shock absorber are coaxially combined and supports a seat frame.

However, such a suspension seat has still had limitation of a suspension stroke due to the location of the suspension unit between a suspension seat and a floor.

SUMMARY OF THE INVENTION

It is an object of the present invention to provide an improved suspension seat which provides a sufficient suspension stroke for absorbing impact force applied to the seat cushion, while suppressing the space between the suspension seat and a floor.

A suspension seat according to the present invention is for an automotive vehicle and comprises a seat frame which is supported to a parallel link mechanism so as to be vertically movable above a vehicular floor. A suspension unit is connected to an upper and back side portion of the seat frame and a rear portion of the parallel link mechanism.

With this arrangement, the suspension seat performs a sufficient suspension function due to the long suspension stroke which is obtained by locating the suspension unit to a back side of the seat frame. Furthermore, since the degree of freedom for selecting the shock absorber and the compression spring is increased, the suspension seat is easily adapted to the requirement of a seat occupant.

BRIEF DESCRIPTION OF THE DRAWINGS

In the drawings, like reference numerals designate like parts and elements throughout all figures, in which.

DETAILED DESCRIPTION OF THE INVENTION

Figure 1:
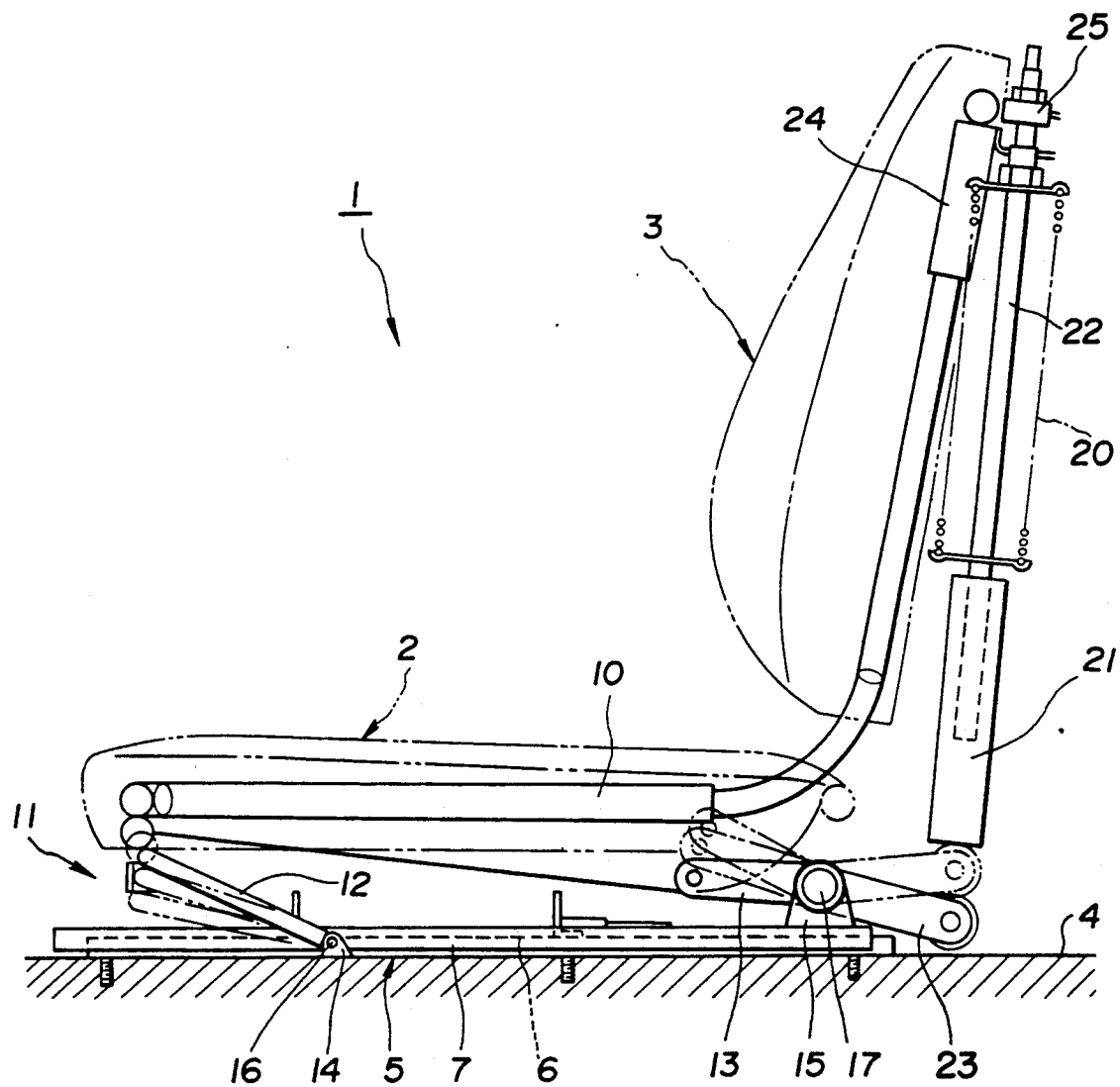
FIG. 1 is a schematic side view showing a first embodiment of a suspension seat according to the present invention.
Figure 2:
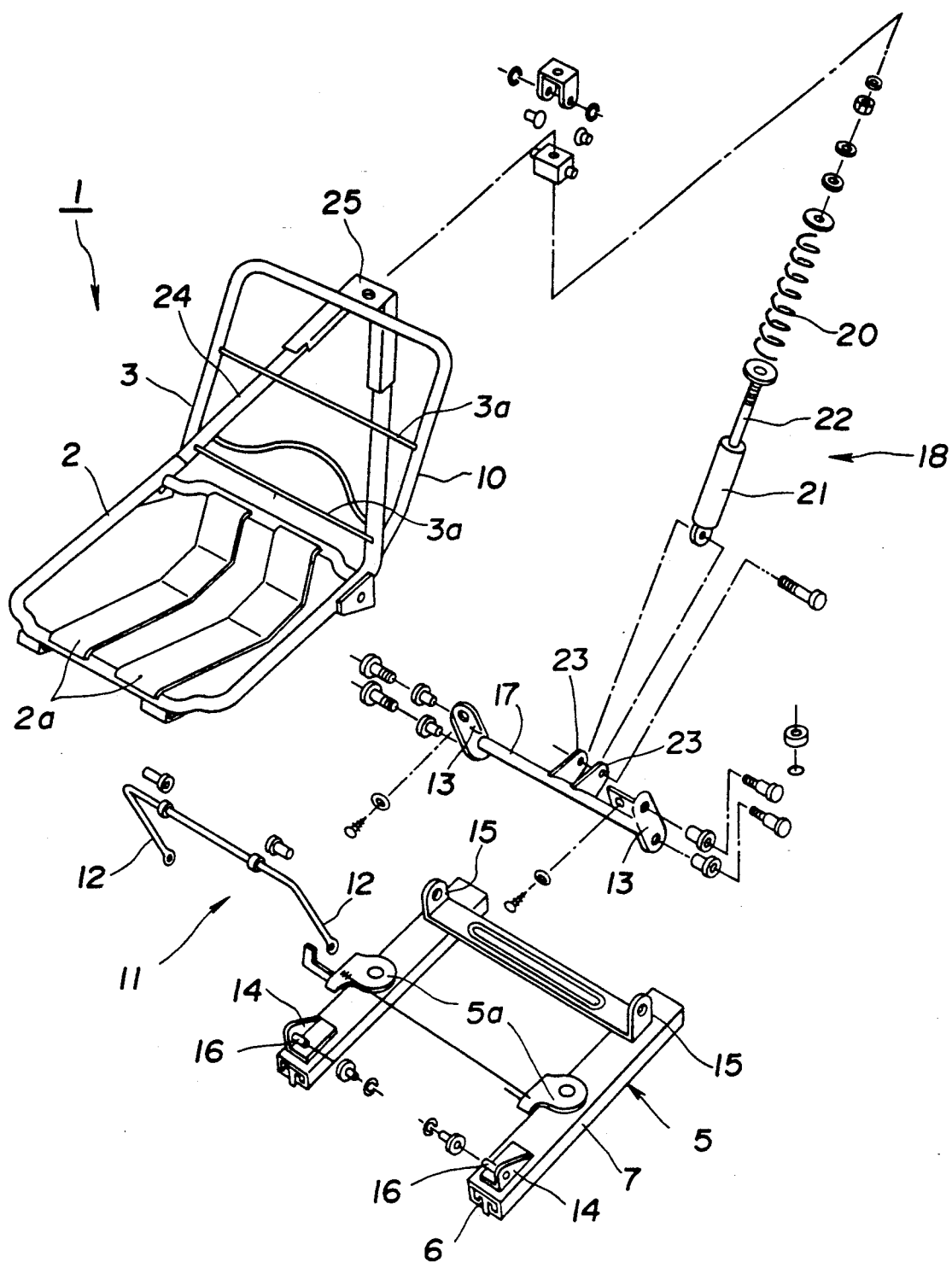
FIG. 2 is an exploded perspective view of the suspension seat of FIG. 1.
Figure 3:
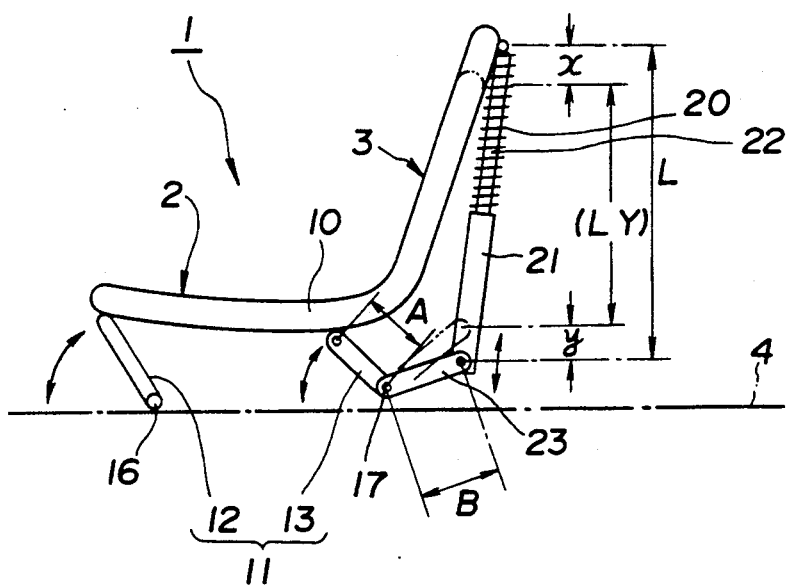
FIG. 3 is a schematic view to explain motions of the suspension seat of FIG. 1.
Figure 4:
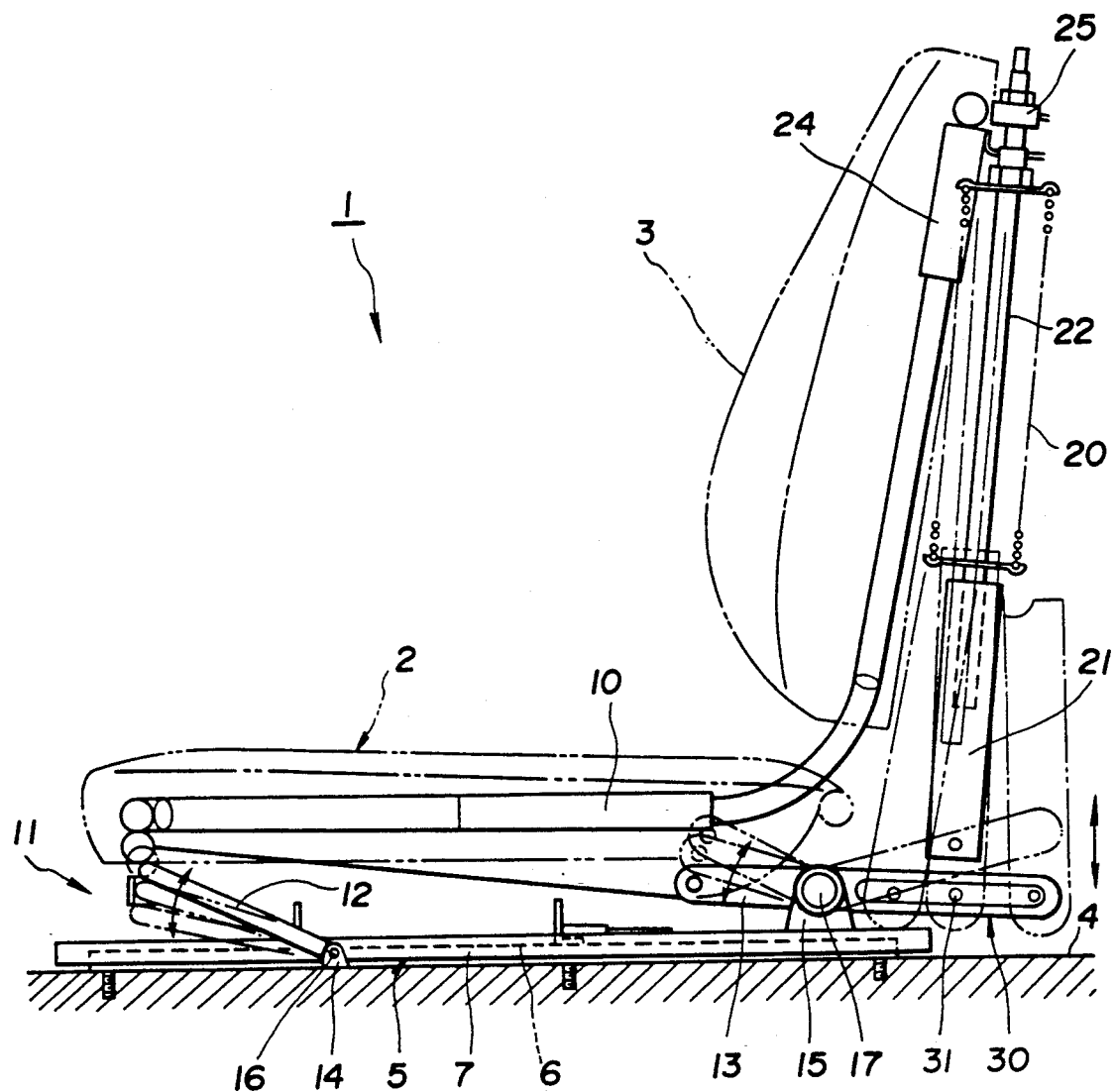
FIG. 4 is a schematic side view showing a second embodiment of the suspension seat according to the present invention.

Referring now to FIGS. 1 to 3, there is shown a first embodiment of a suspension seat 1 according to the present invention.

The suspension seat 1 is for an automotive vehicle and comprises a seat frame 10 including a seat cushion portion 2 and a seat back portion 3. The seat frame 10 is provided with a pair of seat cushion panels 2a for supporting a seat cushion thereon and a seat back pipes 3a for supporting a seat back thereon, as shown in FIG. 2. The seat frame 10 is disposed above a vehicular floor 4 through a seat slide mechanism 5 which is arranged so as to allow the seat 1 to the slidable in the front-and-aft direction. The seat slide mechanism 5 is provided with a pair of fixed rails 6 and a pair of sliding rails 7. The slide mechanism 5 further includes a slide lock 5a for locking the slide of the slide mechanism 5.

A parallel link mechanism 11 is installed between the seat slide mechanism 5 and the seat cushion portion 2 of the seat frame 10 so as to vertically movably support the seat cushion portion 2 on the slide mechanism 5. The parallel link mechanism 11 includes front and rear links 12 and 13, as shown in FIG. 2. A pair of front support brackets 14 are connected to the front portions of the sliding rails 7, respectively. A rear support bracket 15 is connected to the rear portions of sliding rails 7. The front link 12 is generally U-shaped and is connected at its opposite end portions to the front support brackets 14 so as to be pivotable around a pivot portions 16 of the front support bracket 14. A generally intermediate portion of the front link 12 is rotatably supported to the front part of the seat cushion portion 2 of the seat frame 10. The rear link 13 is constituted by a pair of plate members fixedly connected to a supporting shaft 17, as shown in FIG. 2. The rear link 13 is swingably supported at its lower portion to the rear support bracket 15 and swingably supported at its upper portion to the rear part of the seat cushion portion 2 of the seat frame 10.

An arm portion 23 is integrally connected to the supporting shaft 17. A suspension bracket 24 is integrally formed with the seat back portion 3, as shown in FIG. 2. A suspension unit 18 is provided with a compression spring 20 acting as a suspension spring and a shock absorber 21 for absorbing impact force caused by a radical vertical swing of the seat frame 10. The shock absorber 21 has a rod 22 to which the compression spring 20 is coaxially installed so as to always apply a biasing force upwardly to the seat frame 10, as shown in FIG. 2. The lower end portion of the shock absober 21 is pivotally connected to the arm portion 23. The upper end portion of the rod 22 is connected to a connecting end 25 of the suspension bracket 24.

With thus arranged construction, the length of a shock absorber 21 is set to be long enough to increase the suspension stroke to be larger than that of a conventional type. This improves the damping property for the suspension seat 1 owing to the increase of the moving speed of the rod 22 during the impact force absorption. More particularly, since it is easy to change the stroke amount of the suspension seat 1 owing to the sufficient length for the suspension unit 18, it becomes easy to determine the shock absorber 21 and the compression spring 20.

Such advantages of the thus arranged construction will be briefly explained hereinafter with reference to FIG. 3.

In the parallel link mechanism 11, when the length of the rear link 13 is A and the length of the arm portion 23 is B, the stroke amount Y of the suspension unit 18 corresponding to the stroke amount x of the suspension seat 1 is represented as follows:

$$Y = x + y = x + (B/A)x$$

where x is a vertical stroke amount of the suspension seat 1, y is the vertical stroke amount of the arm portion 23, and B/A is the ratio between the lengths of the rear link 13 and the arm portion 23.

In other words, the length of the suspension unit 18 is changed from L to L−Y in order to satisfy a function as a suspension. Accordingly, it will be noted that the stroke amount Y of the suspension stroke is freely set by arranging the ratio B/A.

With the thus arranged suspension seat 1, it becomes possible to reduce the space between the seat cushion portion 2 and the vehicular floor 4 into a necessary minimum. This increases the degree of freedom for designing. Furthermore, since most of the impact force is applied to the rear link 13 in the parallel link mechanism 11, only the rear link 13 may be reinforced in structural strength.

Referring to FIGS. 4 to 7, there is shown a second embodiment of the suspension seat according to the present invention.

Figure 5:
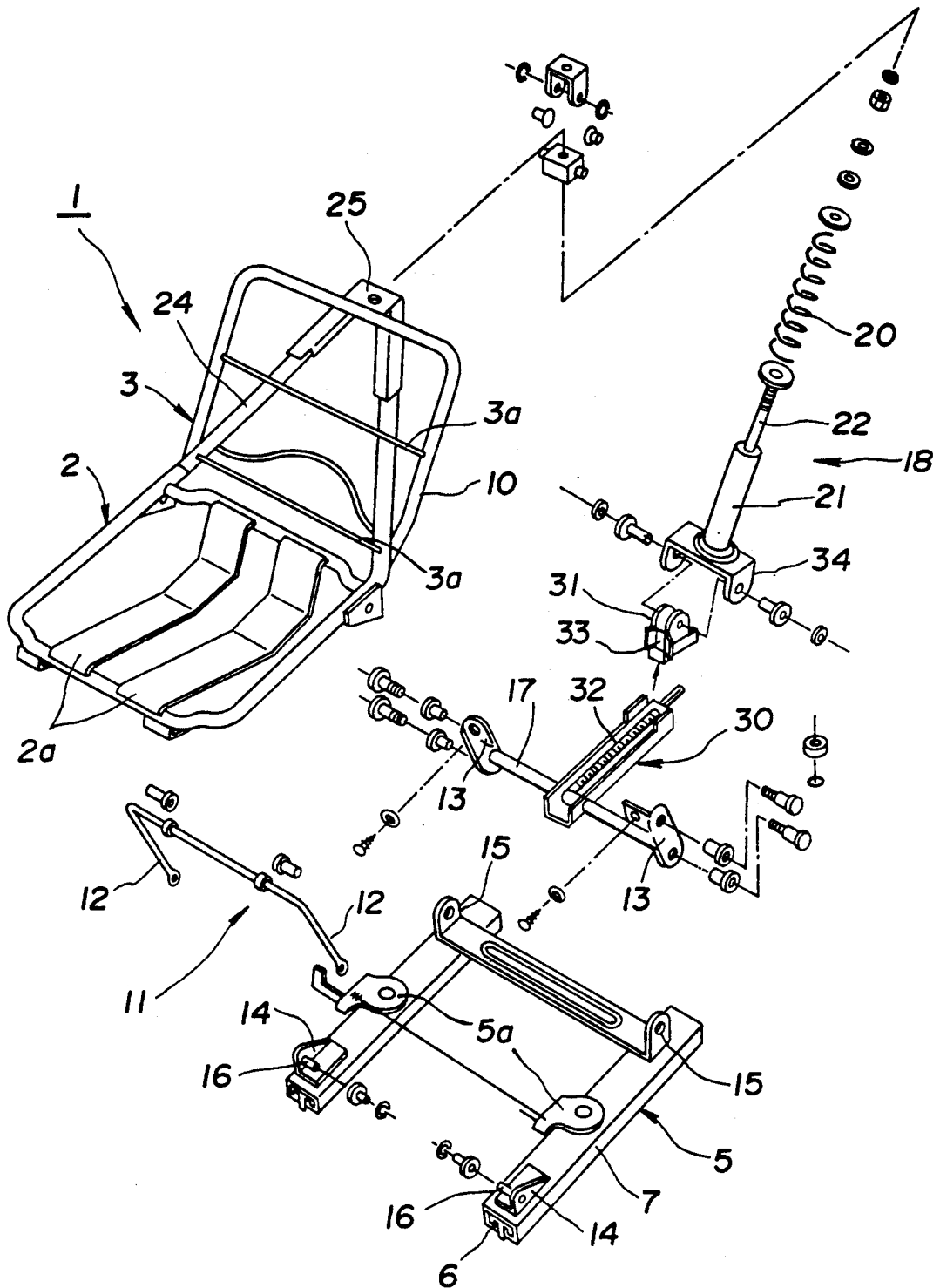
FIG. 5 is an exploded perspective view of the suspension seat of FIG. 4.

The second embodiment of the suspension seat 1 is generally similar to the first embodiment except for an arm portion 30 and a lower end portion of the suspension unit 18 connected thereto. The arm portion 30 of the second embodiment is arranged such that the length B between the supporting shaft 17 and the lower end portion of the shock absorber 21 is changeable by sliding the lower end portion of the shock absorber 21 on the arm portion 30. As shown in FIG. 5, the arm portion 30 is provided with a screw shaft 32 extending along the arm portion 30. A nut 33 is screwed by the screw shaft 32 so as to be slidable according to the rotation of the screw shaft 32. A supporting bracket 31 is connected to the nut 33 and swingably connected to the lower end portion of the shock absorber 21 through a connecting bracket 34. Accordingly, the length B between the supporting shaft 17 and the lower end portion of the shock absorber 21 is changed by the rotation of the screw shaft 32 while the length A of the rear link 13 is fixed at constant. The front and rear links 12 and 13 are inclinedly disposed to form an angle of 45° with the vehicular floor 4. With this link arrangement, the suspension seat 1 is movable to upward and downward direction so that the suspension unit is effectively operated.

Figure 6:
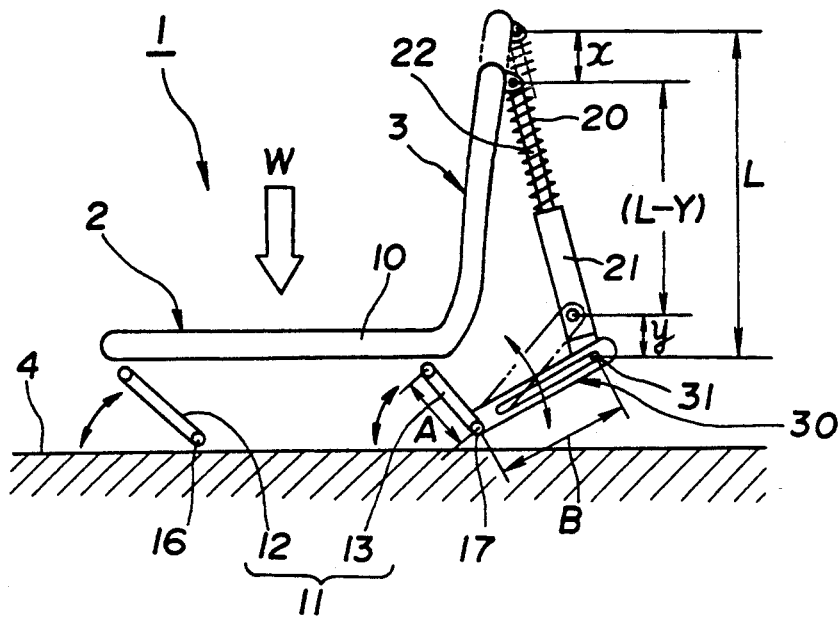
FIG. 6 is a schematic view to explain motions of the suspension seat of FIG. 4 under a heavy load applied condition.

FIG. 6 represents a condition that the heavy load W is applied to the suspension seat 1 of the second embodiment. In this condition, it is preferable that the length B from the supporting shaft 17 to the lower end of the shock absorber 21 is longer than the length A of the rear link 13. With this arrangement, the ratio of the stroke amount x of the seat 1 relative to the stroke amount Y of the suspension unit 18 is set to be large. This enables the suspension characteristics to be set in hard. More particularly, if the front and rear links 12 and 13 are set to have 45 degree angle therebetween, the seat 1 keeps its horizontal state under a heavy load W applied condition. Accordingly, it is preferable to set the stroke amount x to be smaller relative to the stroke amount Y.

Figure 7:
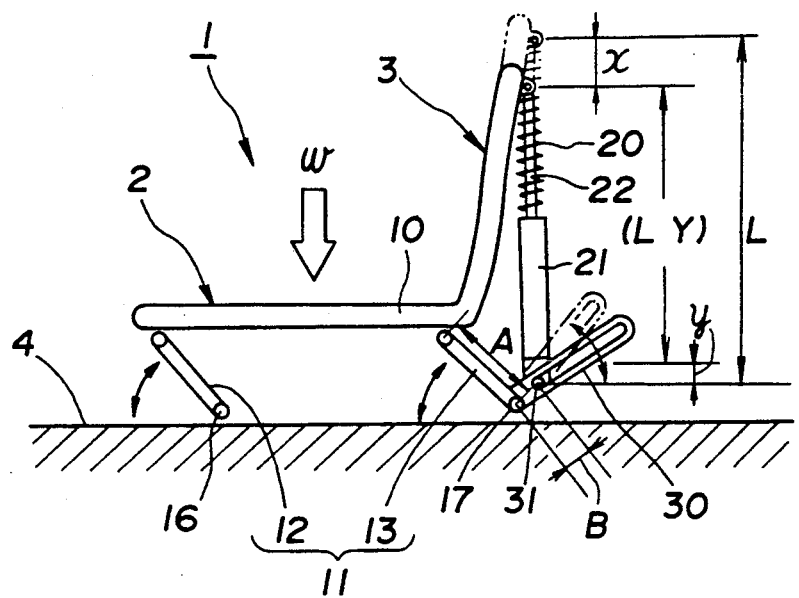
FIG. 7 is a schematic view to explain motions of the suspension seat of FIG. 4 under a light load applied condition.
Figure 8:
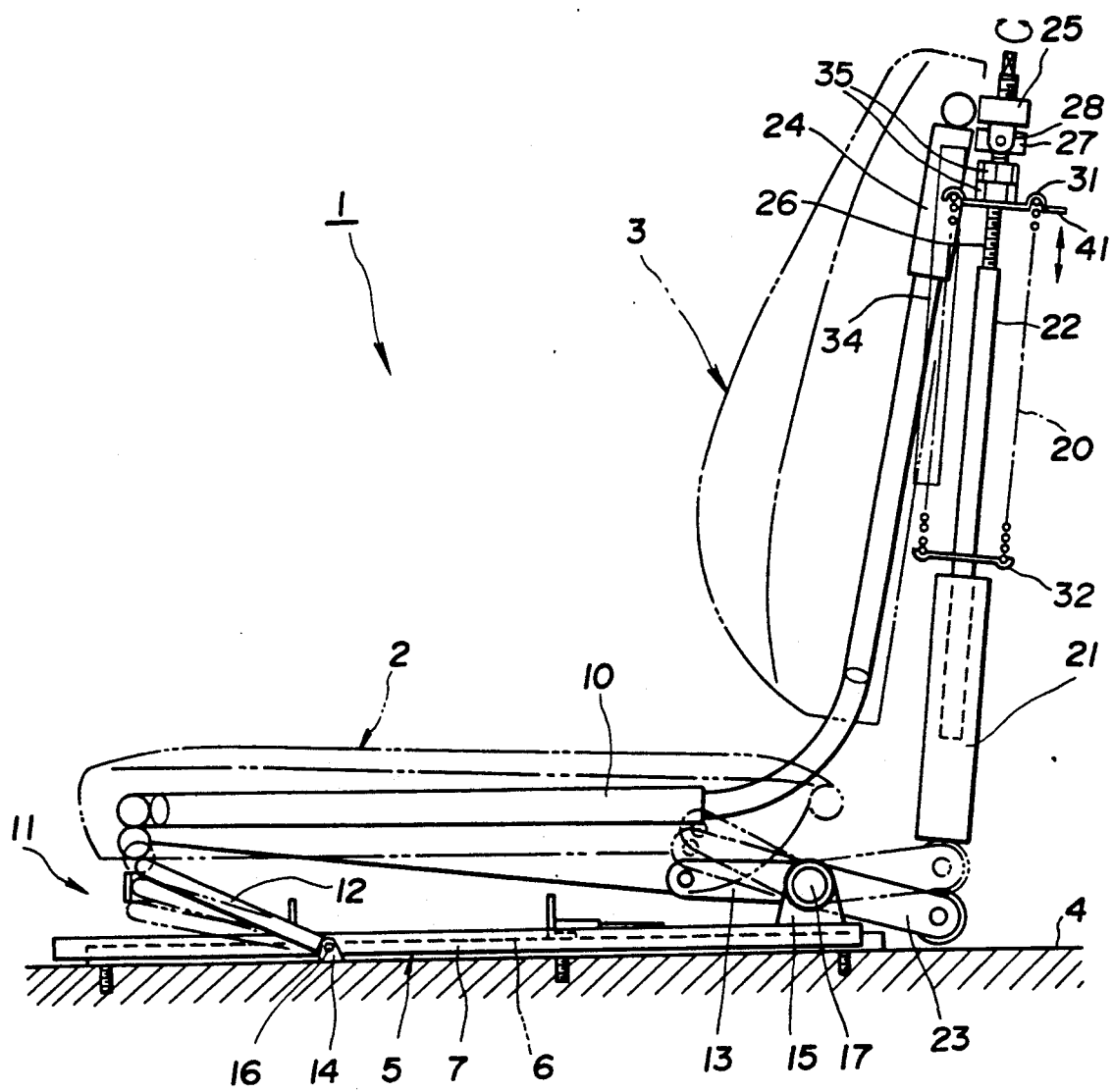
FIG. 8 is a schematic side view showing a third embodiment of a suspension seat according to the present invention.
Figure 9:
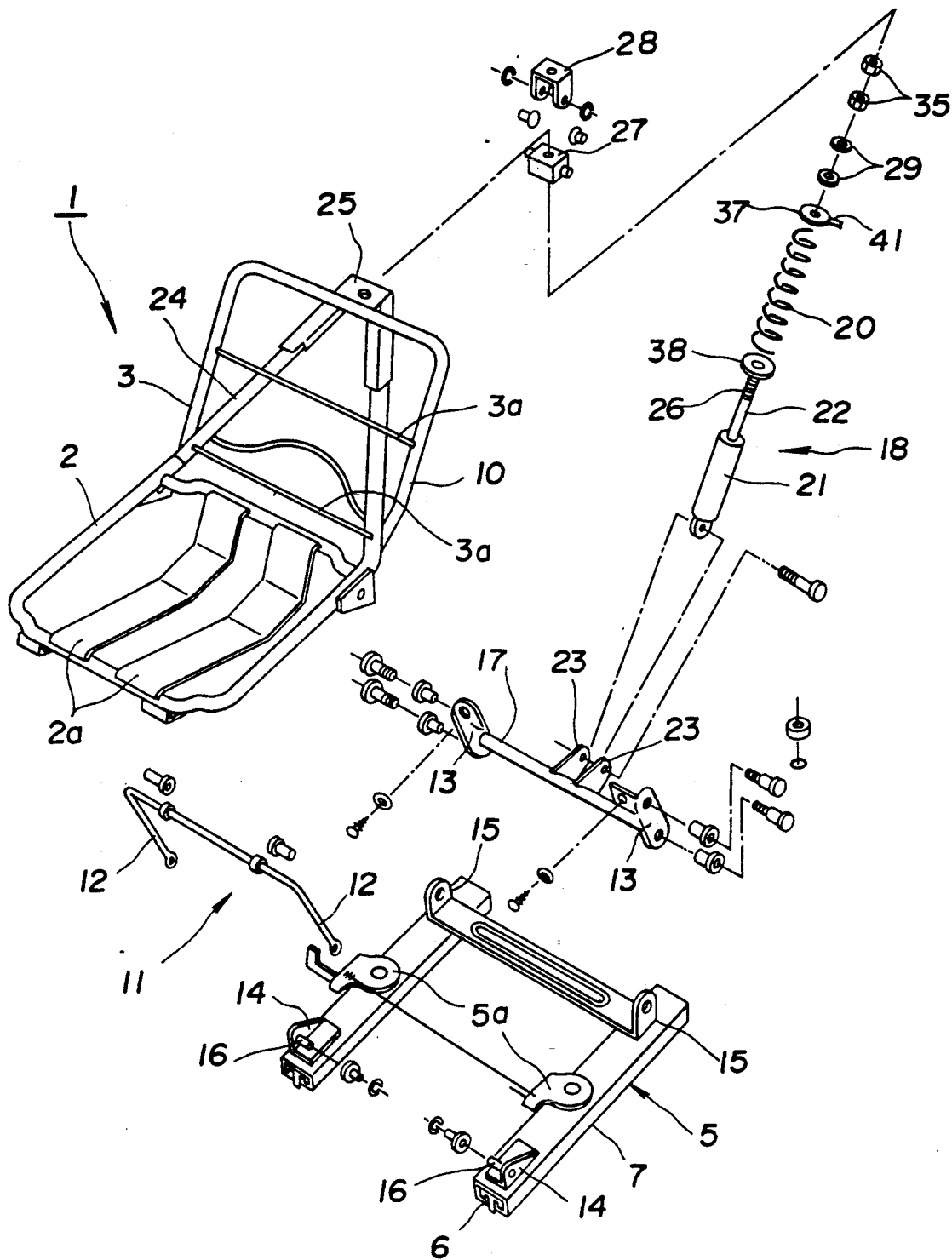
FIG.9 is an exploded perspective view of the suspension seat of FIG. 8.

FIG. 7 represents a condition that the light load w is applied to the seat 1. In this condition, it is preferable that the length B from the supporting shaft 17 to the end of the suspension unit 18 is smaller than the length A of the rear link 13. With this arrangement, the ratio of the stroke amount x of the seat 1 relative to the stroke amount Y of the suspension unit 18 is set to be small. This enables the suspension characteristics to be soft. More particularly, if the front and rear links 12 and 13 are set to have 45 degrees angle therebetween, the seat 1 keeps its horizontal state under a loaded condition. Accordingly, it is preferable to set the stroke amount x large.

In other words, with this arranged suspension seat 1, the stroke amount x of the suspension unit 18 is easily varied according to the load applied to the suspension seat 1. Accordingly, the biasing force of the compression spring 20 is variable. Furthermore, the damping force of the shock absorber 21 is variably controlled by changing the stroke amount x of the suspension unit 18 and the suspension speed. Therefore, it becomes possible that the spring constant of the compression spring 20 and the damping force coefficient of the shock absorber 21 is properly controlled in accordance with the applied load to the seat frame 10.

In this arrangement, the suspension load {=(B/A)×(load applied to the seat 1)+(load applied to the seat 1)} and the suspension speed {=(B/A)×(moving speed of the seat 1)+(moving speed of the seat 1)} are in the relationship of a direct proportion.

Referring to FIGS. 8 to 11, there is shown a third embodiment of the suspension seat 1 according to the present invention.

The third embodiment of the suspension seat 1 is similar to the first embodiment except that the biasing force of the compression spring 20 is controllable by the rotation of the rod 22. The upper portion of the rod 22 is machined to form a screw portion 26 whose upper end portion is fixed to the connecting end 25 of the suspension bracket 24 through a screw nut 27, a nut housing and the like. The screw portion 26 is arranged such that its upper end projects upwardly from the upper end of the seat frame 10 and is rotated for changing the condition of the suspension unit 18.

The compression spring 20 is sandwiched between upper and lower washers 37 and 38, and is penetrated by the rod 22. It is noted that the lower end of the compression spring 20 may be fixed to a flange portion integrally formed with the rod 22 without the lower washer 38.

A pair of nuts 35 are disposed on the upper washer 37 and screwed with the screw portion 26 of the rod 22.

The compression spring 20 and the upper and lower washers 37 and 38 are restricted in rotation by a stopper 34. A pair of washers 29 are disposed between the upper washer 37 and the nuts 35. Although not shown in Figures, it is noted that a bearing may be disposed between the upper washer and the washer 29 for smoothly rotating the screw portion 26.

With this arrangement, by rotating the upper end of the screw portion 26, the biasing force of the compression spring 20 is easily and rapidly controlled. Then, the nuts 35 are vertically moved according to the rotation of the screw portion 26.

Furthermore, since the biasing force of the compression spring 20 is indirectly transmitted to the screw portion 26 through the nuts 35 and its direction is perpendicular to the operational direction of the screw portion 26, the changing operation of the biasing force is easily carried out.

Figure 10:
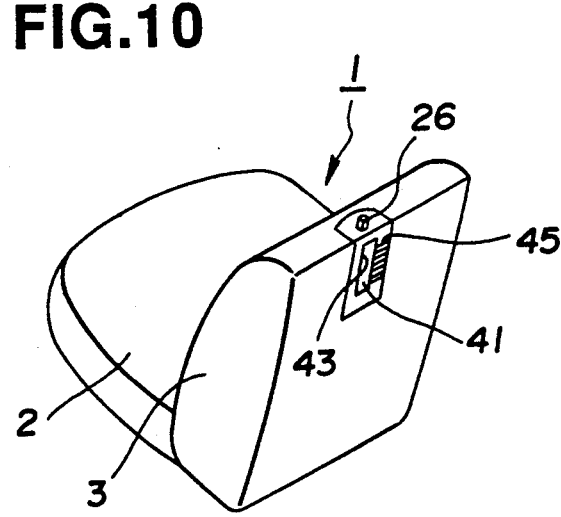
FIG. 10 is a schematic perspective view of the suspension seat of FIG. 8.

As shown in FIG. 10, a pin 41 is integrally formed with the upper washer 37 and is vertically slidably engaged with a guide slit 43 formed at the back side surface of the seat back portion 3. In order to easily distinguish the degree of the biasing force of the compression spring 20, a scale 45 for indicating the position of the pin 41 is printed on the seat back 3 along the guide slit 43.

Figure 11:
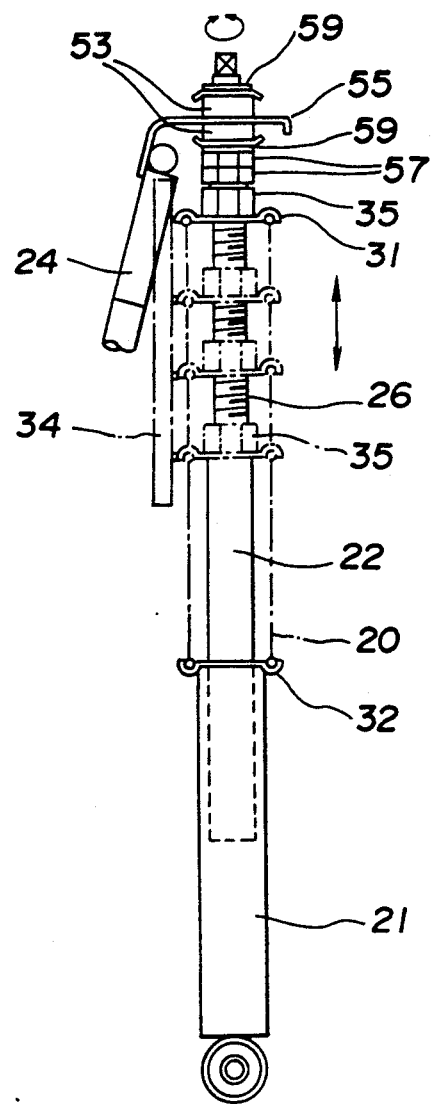
FIG. 11 is a side view of a variation of a suspension unit applied to the suspension seat of the third embodiment.

FIG. 11 shows a variation of the suspension unit of the third embodiment of the suspension seat 1. The suspension unit 18 is arranged such that the a nut 35 is disposed on the upper washer 37, and thereon a pair of nuts 57 are screwed with the screw portion 26. An upper end 55 of the bracket 24 is sandwiched between a pair of rubber members 53. A bearing 59 is disposed between the nut 57 and the rubber member 53.

With this arrangement, the nuts 35 and the upper washer 37 is continuously moved from a position illustrated by a continuous line to a position illustrated by dashed line by the rotation of the screw portion 26, as shown in FIG. 11.

Obviously many modifications and variations of the present invention are possible in the light of the above teachings. For example, although the shock absorber 21 has been shown and described to be disposed between the rear link 13 and the upper portion of the seat back portion 3 in the preferred embodiments, it will be understood that the shock absorber 21 may be disposed between the seat 1 and the vehicular floor 4. Furthermore, it will be noted that the shock absorber 21 may be installed in reverse.

Although the suspension seat 1 according to the invention is effectively applied to construction vehicles and normal vehicles, it will be noted that the suspension seat 1 may applied to others.

What is claimed is:

1. A suspension seat for an automotive vehicle comprising:
   a seat frame comprising a seat cushion portion and a seat back portion;
   a parallel link mechanism supporting said seat frame such that said seat frame is vertically movable above a vehicular floor, said parallel link mechanism having a front link and a rear link which are separated from each other, the rear link having an arm portion which extends rearward of the seat frame; and
   a suspension unit including a compression spring and a shock absorber which are coaxially assembled, said suspension unit extending in a generally vertical direction and being connected to an upper portion of the seat back portion and to the arm portion;
   having a vertical that said suspension unit varies in direct relation to a vertical movement of said seat frame; and
   having a vertical height that said arm portion varies in reverse relation to the vertical movement of said seat frame.

2. A suspension seat as claimed in claim 1, wherein the shock absorber includes a sliding rod whose upper portion is machined to form a screw portion, and the sliding rod screw portion is connected to the upper and back side portion of said seat frame and is screwed with a nut which is disposed on the compression spring through a washer, such that biasing force of the compression spring is changed by rotating the nut.

3. A suspension seat as claimed in claim 1, wherein a lower end portion of said suspension unit is swingably connected through a supporting bracket to a sliding arm portion fixed to said parallel link mechanism such that a length between the parallel link mechanism and the lower end portion of said suspension unit is changeable.

4. A suspension seat as claimed in claim 1, wherein said rear link is constituted by a pair of plate members fixedly connected to a supporting shaft to which said arm portion is integrally connected.

5. A suspension seat as claimed in claim 4, wherein a lower end portion of said suspension unit is connected to the arm portion.

6. A suspension seat as claimed in claim 1, wherein said arm portion is integrally connected to a supporting shaft.

7. A suspension seat as claimed in claim 6, wherein said arm portion is pivotally connected to a lower end portion of said shock absorber.

8. A suspension seat for an automotive vehicle comprising:
   a seat frame having a seat back portion and a seat cushion portion;
   a parallel link mechanism, including front and rear links, supporting said seat frame at said seat cushion portion to be vertically movable above a vehicular floor; and
   a suspension unit including a compression spring and a shock absorber which are coaxially arranged so as to absorb impact force in the vertical direction, said suspension unit extending in the generally vertical direction and being connected to an upper portion of the seat back portion and to an arm portion;
   having a vertical height that said suspension unit varies in direct relation to a vertical movement of said seat frame; and
   having a vertical height that said arm portion varies in reverse relation to the vertical movement of said seat frame.

9. A suspension seat as claimed in claim 8, wherein said arm portion is integrally connected to a supporting shaft.

10. A suspension seat as claimed in claim 9, wherein said arm portion is pivotally connected to a lower end portion of said shock absorber.

* * * * *